(No Model.)
J. E. EDWARDS.
VITRIFIED FIRE CLAY SEWER PIPE JOINT.
No. 515,119. Patented Feb. 20, 1894.
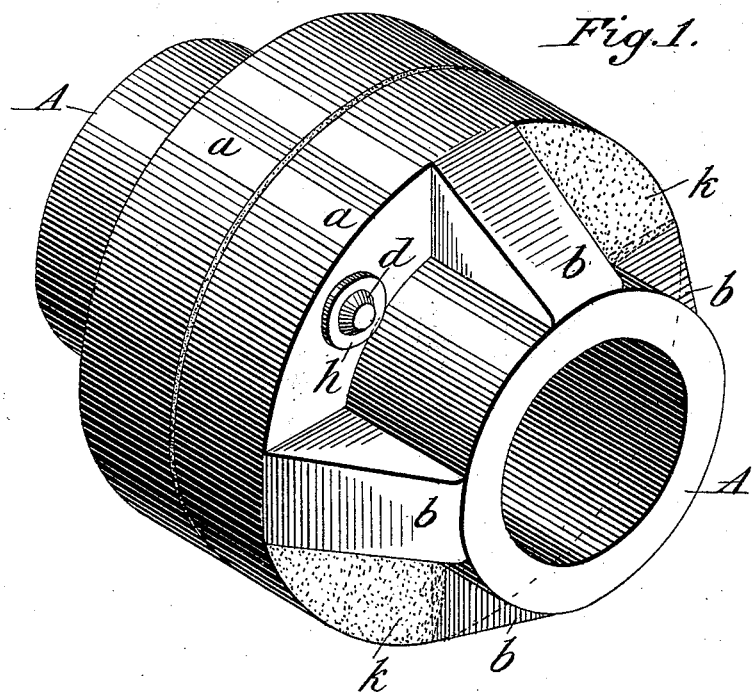
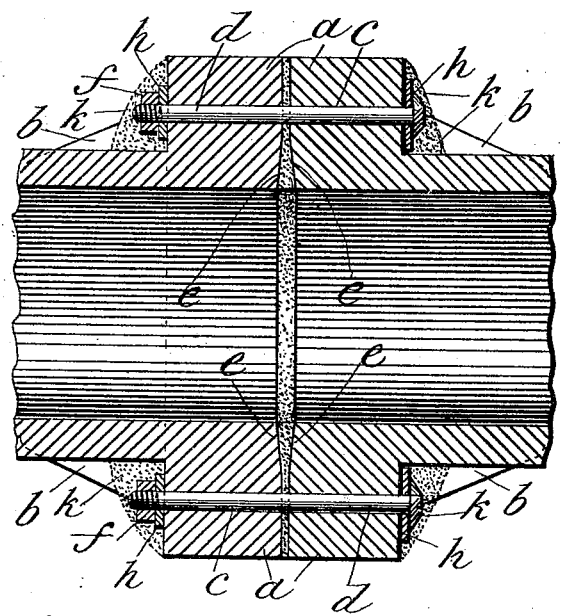
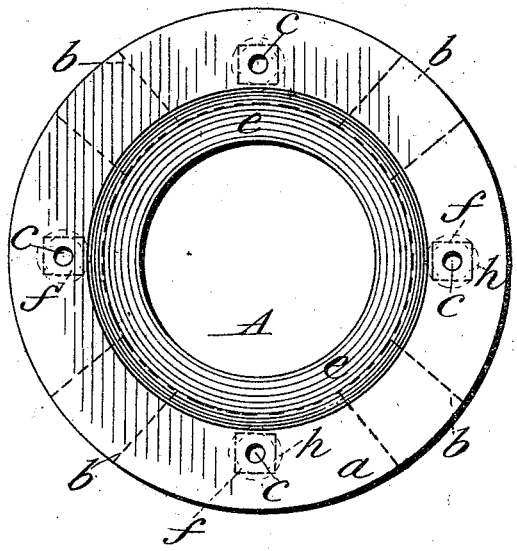
Attest:
H. H. Schott
R. H. Elliott
Inventor
Joseph E. Edwards
by Grant Burroughs
Atty.

UNITED STATES PATENT OFFICE.

JOSEPH E. EDWARDS, OF TORONTO, OHIO.

VITRIFIED-FIRE-CLAY-SEWER-PIPE JOINT.

SPECIFICATION forming part of Letters Patent No. 515,119, dated February 20, 1894.

Application filed July 3, 1893. Serial No. 479,543. (No model.)

*To all whom it may concern:*

Be it known that I, JOSEPH E. EDWARDS, a citizen of the United States, residing at Toronto, in the county of Jefferson and State of Ohio, have invented certain new and useful Improvements in Joints for Pipes Formed of Vitrified Fire-Clay, of which the following is a full, clear, and exact description, such as will enable those skilled in the art to which it appertains to make and use the same.

This invention relates to improvements in joints for pipes formed of vitrified fire-clay.

It has for its object the provision of a joint whereby earthenware pipes may be connected so as not to be liable to leak, even when under considerable internal pressure.

It also has for its object the provision of such a joint in which metal is used in forming the same, but in which the metal is protected from the action of any corroding agent that may be carried by the water, such as copperas.

In constructing pipe lines in mines, much trouble is often experienced in handling the water when it happens to be impregnated with acids, &c., as iron pipes are soon destroyed and consequently must be replaced, which makes a considerable item in the cost of working the mine. In such instances earthenware pipe is sometimes used in place of iron pipe.

Heretofore much trouble has been encountered in forming the joints in the earthenware pipe so used, especially when the internal pressure was considerable. When the joints were made of metal, or metal used in their construction, they had to be renewed quite often, and sometimes gave away and caused considerable damage. It is proposed in the present instance to provide a joint for earthenware pipes which will not be liable to the attacks of an ordinary corroding agent, and which, at least, will sustain an internal pressure equal to that which the pipe proper can sustain.

The invention consists in the novel construction, combination and arrangement of parts such as will be hereinafter fully described, pointed out in the appended claim, and illustrated in the accompanying drawings.

In the accompanying drawings, in which similar letters of reference designate corresponding parts, Figure 1 is a perspective view of a joint embodying the invention. Fig. 2 is a longitudinal section through the same. Fig. 3 is an end elevation of one of the sections.

Referring to the drawings by letter, A, A, designate sections of pipe connected by the joint. The end of each section is provided with a flange $a$, which has considerable width and thickness as compared with the diameter of the pipe and the thickness of the wall of the same. At regular intervals, braces or knees $b, b$, are provided which serve to more firmly secure the flange to the pipe proper. These braces also serve to protect the cement coverings for the bolts as will be hereinafter explained. These braces also have considerable thickness and may vary in number according to the size of the pipe. Intermediate of the braces, bolt holes $c, c$, are formed through which bolts $d, d$, extend to connect two adjoining sections. The face of each flange is cut away near its inner periphery, as at $e$, for a purpose which will be explained farther on.

To connect two sections, they are placed end to end, the contacting faces of the flanges having been previously covered with a cement suitable in the premises, with the bolt holes in the flanges registering. The bolts are then inserted in the holes prepared for them and by means of the nuts $f, f$, the two flanges are firmly united. Washers $h, h$, may be provided to increase the bearing surfaces of the nuts and the bolt-heads. After the two flanges have been brought together, their cut away portions $e, e$, will form a V-shaped crease which will be filled with cement. After the cement has become hardened it cannot be displaced by any internal pressure owing to its wedge shape. This insures a complete covering and filling in of the space intervening between the flanges. The surplus cement can be removed from the interior of the joint in any suitable manner. To protect the exposed portions of the bolts from the action of any corroding agent, cement is spread over the sections of the flanges between the braces $b, b$, as at $k$, thereby forming complete coverings for the metal parts of the joint. The knees or braces $b, b$, protect the cement coverings and serve to cause the latter to more firmly adhere to the flanges than it would if they should be made perfectly plain. It is obvious that a pipe system constructed in this manner could be used as ordinary water supply pipes, where the pressure is not excessive. This would be advantageous, owing to the cheapness of the pipes as compared with iron ones.

Having thus described my invention, what I claim, and desire to secure by Letters Patent, is—

In a joint for pipes formed of earthenware, the combination of the sections, proper, the annular flanges projecting from the ends thereof, the braces or knees placed in the angles formed between a flange and the wall of each section, the bolts passing through the flanges to connect the same, the holes for the said bolts being formed in the flanges between the braces or knees, and the cement coverings for the said bolts placed between the said knees or braces, as described.

JOSEPH E. EDWARDS.

Witnesses:
 WILL. C. BLEU,
 JOHN A. BURCHFIELD.